(12) United States Patent
Lee et al.

(10) Patent No.: US 12,273,626 B2
(45) Date of Patent: Apr. 8, 2025

(54) SYSTEM FOR PROVIDING PANORAMIC IMAGE

(71) Applicant: IGIS CO., LTD, Daegu (KR)

(72) Inventors: Ho-Dong Lee, Daegu (KR); Hu-Dong Lee, Daegu (KR)

(*) Notice: Subject to any disclaimer, the term of this patent is extended or adjusted under 35 U.S.C. 154(b) by 0 days.

(21) Appl. No.: 18/028,524

(22) PCT Filed: Mar. 24, 2022

(86) PCT No.: PCT/KR2022/004125
§ 371 (c)(1),
(2) Date: Mar. 25, 2023

(87) PCT Pub. No.: WO2023/022317
PCT Pub. Date: Feb. 23, 2023

(65) Prior Publication Data
US 2024/0031681 A1    Jan. 25, 2024

(30) Foreign Application Priority Data
Aug. 18, 2021 (KR) .......... 10-2021-0108977

(51) Int. Cl.
*H04N 23/698*   (2023.01)
*H04N 7/18*     (2006.01)
(Continued)

(52) U.S. Cl.
CPC .......... *H04N 23/698* (2023.01); *H04N 7/185* (2013.01); *H04N 23/66* (2023.01); *B64U 10/00* (2023.01);
(Continued)

(58) Field of Classification Search
CPC ...... H04N 23/698; H04N 23/66; B64U 10/00; B64U 2101/30
See application file for complete search history.

(56) References Cited

U.S. PATENT DOCUMENTS 7,304,645 B2 * 12/2007 Blask .............. G01S 17/89
345/424
9,969,492 B2 * 5/2018 Detweiler ............ G01S 17/42
(Continued)

FOREIGN PATENT DOCUMENTS

KR    10-1718287    4/2017
KR    10-2017-0067373    6/2017
(Continued)

OTHER PUBLICATIONS

Drones and areal observations; Kakaes—2015; (Year: 2015).*
(Continued)

*Primary Examiner* — Luis Perez-Fuentes
(74) *Attorney, Agent, or Firm* — ANTONIO HA & U.S. PATENT, LLC (57) ABSTRACT

The present invention relates to a system for providing a panoramic image that allows work to be done conveniently and all at once, from a taking picture by means of a drone to a panoramic web service, and enables real-time monitoring of work progress. The present invention relates to a system for providing a panoramic image that: when taking a picture by means of a drone, uses a drone app (Dfos APP) to allow for taking a picture conveniently with a regular camera; when planar spatial data is converted into panoramic spatial coordinates, makes it possible to display and confirm the planar spatial data through a panorama service, such that existing or necessary planar spatial data can be utilized; and connects a service provider who provides the service (a photographer through a drone) and a service user who needs the service (a user of the panorama service) through the advancement of a business model and activation of the panorama service, thus creating value through active transactions and ultimately generating revenue.

1 Claim, 6 Drawing Sheets

(51) Int. Cl.
*H04N 23/66* (2023.01)
*B64U 10/00* (2023.01)
*B64U 101/30* (2023.01)

(52) U.S. Cl.
CPC ...... *B64U 2101/30* (2023.01); *B64U 2201/20* (2023.01)

(56) References Cited

U.S. PATENT DOCUMENTS 10,255,520 B2 * 4/2019 Deng ................ G01S 17/06
10,607,409 B2 * 3/2020 Troy ................ G06T 17/00

FOREIGN PATENT DOCUMENTS

| KR | 10-2017-0081488 | 7/2017 |
| KR | 10-1762927 | 7/2017 |
| KR | 10-1896654 | 9/2018 |
| KR | 10-2001143 | 7/2019 |
| KR | 10-2122755 | 6/2020 |
| KR | 10-2021-0069773 | 6/2021 |

OTHER PUBLICATIONS

English Specification of 10-1718287.
English Specification of 10-1762927.
English Specification of 10-1896654.
English Specification of 10-2017-0081488.
English Specification of 10-2021-0069773.
English Specification of 10-2122755.
English Specification of 10-2001143.
English Specification of 10-2017-0067373.

* cited by examiner

SYSTEM FOR PROVIDING PANORAMIC IMAGE

TECHNICAL FIELD

The present invention relates to a system for providing a panoramic image, and more particularly, to a system for providing a panoramic image, which enables a user to conveniently work at once from taking a photograph using a drone to providing a panoramic web service at once, and enables a user to check a work process in real time.

BACKGROUND ART

A drone is an unmanned aerial vehicle which flies by a remote control or autonomously flies along a designated route, and has been mainly utilized for military purposes, but has recently been utilized in various fields such as a transportation field, a security field, and the like, and has also been used as a personal use.

Such a drone are gradually increased in utilization ranges, and images captured by the drone are used in various fields.

Among images captured by the drone, there are panoramic images, and various technologies using the panoramic images have been developed. Patent documents 1 to 3 disclose the technologies using panoramic images.

The patent document 1 (Korean Patent No. 10-1718287) discloses an aerial safety diagnosis method using a drone comprising the steps of: using a first camera sensor and a second camera sensor coupled to a gimbal mounted on the drone, acquiring a plurality of risk factor detection images so that an overlapping area occurs when the drone moves along a set path by using the first camera, acquiring a plurality of second images to generate an overlapping area by using the second camera, and storing the risk factor detection image and the second image in a data storage unit provided in the drone; obtaining the risk factor detection image and the second image stored in the data storage unit in a wireless or wired manner at the time of landing of the drone, forming one risk factor panoramic image by matching the overlapping areas of the plurality of risk factor detection images, and removing the overlapping areas of the plurality of second images to process the same into a three-dimensional real image; projecting the panoramic image for detecting the risk factor onto the three-dimensional real image to map a position of a risk factor on the three-dimensional real image; and determining whether the mapped panoramic image of the object to be inspected is defective based on a preset reference to determine safety of the object to be inspected, wherein the risk factor detection image is one among a thermal image, an infrared image, and a near infrared image, and the gimbal includes: a housing having a first hole and a second hole for respectively arranging the first camera sensor and the second camera sensor in a horizontal direction; a first driving motor disposed on one side surface of the housing to vertically tilt the housing; a support mounted on the rear surface of the housing and extending upward; a second driving motor mounted on an upper surface of the support unit to rotate the housing left and right; and a damper arranged in a radial direction with respect to the second driving motor to prevent shaking during flight of the drone.

The patent document 2 (Korean Patent No. 10-1762927) discloses a panorama auto labeling system based on a drone captured image including: a drone having a 360° camera mounted thereon, a positioning module for measuring the present position, and a posture measuring module for measuring a position of a position, so as to obtain a still image and a video; an image content database for storing the still image and the video acquired through the drone; a GIS database for storing GIS information; a PGM manager for matching a panorama and GIS information to each other; a web application server (WAS) 160 configured to provide a result matched by the PGM manager to a user based on a Web, wherein the WAS synchronizes the position obtained by the drone and the posture data during the process of obtaining still image contents, video contents and the corresponding contents obtained through the drone, and synchronizes panorama still images and videos captured by the drone and GIS data to provide a user terminal with panorama still image and video services having additional information, and wherein the drone includes: a drone main body having a first installation space formed therein and opened at a lower portion, a forward and reverse rotary motor mounted on the upper surface of the first installation space while locating a driving shaft vertically, a spiral bar coupled to the driving shaft of the forward and reverse rotary motor to rotate interlocking with the driving shaft when the forward and reverse rotary motor drives, and a second installation space surrounding the first installation space and opened at a lower portion; a plurality of connection parts formed along the lower circumference of the drone main body; supports respectively mounted on the connection parts in such a way that one end of each support in a longitudinal direction is coupled to the connection part and the other end extends outward from the drone main body in the horizontal direction; a propulsion part mounted at an end opposite to the end of the support connected to the connection part to generate thrust; a landing part provided below the support; a camera installation stand having a spiral tube screw-coupled to a spiral rod of the drone main body, mounted on an upper surface thereof, accommodated in the first installation space of the drone main body to be prevented from being rotated and to be lifted or lowered according to forward and reverse rotation of the forward and reverse rotary motor, and having a camera installation space formed therein so that the 360° camera is installed in the camera installation space; a plurality of cylinders respectively at four corners of the upper surface of the second installation space of the drone main body; a fine dust blocking box which has a box-shaped structure of which upper and lower portions are open in such a way that both ends of four sides are connected to one another, of which four sides are respectively inserted into the corresponding areas of the second installation space of the drone main body so that a rod front end of the corresponding cylinder among the cylinders is coupled to the connected area of the four sides, and of which the four sides respectively have perforated type openings through which air passes; fine dust filters detachably coupled to the openings of the four sides of the fine dust blocking box; blowing devices respectively mounted in the openings inside the fine dust filter for the four sides of the fine dust blocking box; a pair of main body covers rotatably coupled to both sides of the drone main body in the horizontal direction to open and close the first installation space of the drone main body; a wireless communication module mounted in the drone main body to receive regional fine dust information from the outside; a wind direction sensor mounted in the drone main body to sense a current wind direction; and a controller having external fine dust threshold value for controlling operation of the blowing devices, and controlling the operation of the blowing device at the corresponding position among the blowing devices based on the current wind direction information input through the wind direction sensor in a case in which the fine dust concentration around the current position exceeds the threshold value of the external fine dust based on the current position information input from the positioning module of the drone and the regional fine dust information input through the wireless communication module, wherein the controller further includes a drone remote control terminal for transmitting a signal for controlling the operation of the 360° camera to the wireless communication module of the drone, so that the controller controls opening and closing of the cylinder and the main body cover according to a control signal of the drone remote control terminal input through the wireless communication module.

Patent Document 3 (KR Patent No. 10-1896654) discloses a three-dimensional image processing system using a drone including: a plurality of drones which are spaced apart from a subject at a predetermined distance, photographing the subject while flying around the subject to obtain original images; a wireless control device for controlling the operation of the drone to receive and store the original images captured by the drone in real time; and an image processing device for receiving the plurality of original images and matching the plurality of original images as one stereoscopic image, wherein the wireless control device includes a storage unit including a plurality of storages for controlling the drone to fly along a predetermined path at a position spaced apart from the subject at the predetermined distance, storing the original images respectively received from the plurality of drones, and wherein the image processing device includes: a preprocessor for preprocessing the plurality of original images; a labeling unit for setting a label according to a photographing time point in each of the plurality of preprocessed images; an image analysis unit configured to identify a viewpoint of labeled images based on the subject appearing in the image and classify an image corresponding to each viewpoint from 0° to 360°; and an image matching unit configured to generate one stereoscopic image by matching images for each viewpoint.

As described above, various technologies using panoramic images obtained by a drone have been developed. However, such technologies have a limitation in that it needs specific programs or lots of time and manpower to take images in a case in which panoramic images are captured by using a special camera capable of 360° photographing or by using a general camera.

In addition, since the current panorama services have a problem in that it needs a temporal demand and a cost burden since the panorama services are separately implemented as individual services such as photographing, panoramic image production, a panorama web service, and the like.

DISCLOSURE

Technical Problem

Accordingly, the present invention has been made in view of the above-mentioned problems occurring in the related art, and it is an object of the present invention to provide a system for providing a panoramic image capable of allowing a user to conveniently work at once from taking a photograph using a drone to providing a panoramic web service at once, and allowing a user to check a work process in real time.

It is an object of the present invention to provide a system for providing a panoramic image which enables a user to conveniently take a picture using a drone application (Dfos APP) when taking a picture using a drone, and can display and check planar space data through a panorama service when the planar space data is converted into panorama space coordinates, thereby enabling the user to utilize existing or necessary planar space data.

It is another object of the present invention to provide a system for providing a panoramic image which can allow a user to generate a value and ultimately create profit by generating an active transaction through a connection between a service provider (a photographer using a drone) providing a service through a business model elevation and an activation of panorama services, and a service user (a panorama service consumer) requiring the services.

Technical Solution

To accomplish the above-mentioned objects, according to the present invention, there is provided a system for providing a panoramic image including: a drone having a camera to capture an image and remotely receiving a signal to control flight and driving of the camera; a supplier terminal having a drone control application capable of controlling the drone, and collecting and transmitting image information received from the drone; a management server collecting, storing and editing the image information received from the supplier terminal to provide a panoramic image; and a user terminal receiving the panoramic image information provided from the management server.

The management server includes an information storage DB for storing information including the collected and edited panoramic image information.

The management server converts the location information of the drone controlled through the drone control application of the supplier terminal into spatial coordinates.

Advantageous Effects

The system for providing a panoramic image according to the present invention enables photographing using a general camera instead of a 360° camera in case of photographing, thereby enabling efficient photographing.

In addition, the system for providing a panoramic image according to the present invention can reduce time, costs, and manpower by integrating individual services separated from each other and automating work requiring manpower.

Furthermore, the system for providing a panoramic image according to the present invention enables a user to take images and produce panorama services without inconvenience through automation in photographing and procedures by using a drone, and enables a consumer to rapidly obtain desired panoramic images.

Additionally, the system for providing a panoramic image according to the present invention can allow a user to generate a value and ultimately create profit by generating an active transaction through a connection between a service provider (a photographer using a drone) providing a service through a business model elevation and an activation of panorama services, and a service user (a panorama service consumer) requiring the services.

MODE FOR INVENTION

The example embodiments of the present invention are capable of various modifications and alternative forms, and particular embodiments of the present invention will be illustrated in the attached drawings and described in this specification in detail. It should be understood, however, that there is no intent to limit example embodiments of the invention to the particular forms disclosed, but on the contrary, example embodiments of the invention are to cover all modifications, equivalents, and alternatives falling within the technical idea and scope of the present invention.

In the attached drawings, similar components have similar reference numerals. In the following description of the present invention, a detailed description of known functions and configurations incorporated herein will be omitted when it may make the subject matter of the present invention rather unclear.

The present invention relates to a system for providing a panoramic image, and more particularly, to a system for providing a panoramic image, which enables a user to conveniently work at once from taking a photograph using a drone to providing a panoramic web service at once, and enables a user to check a work process in real time.

Figure 1:
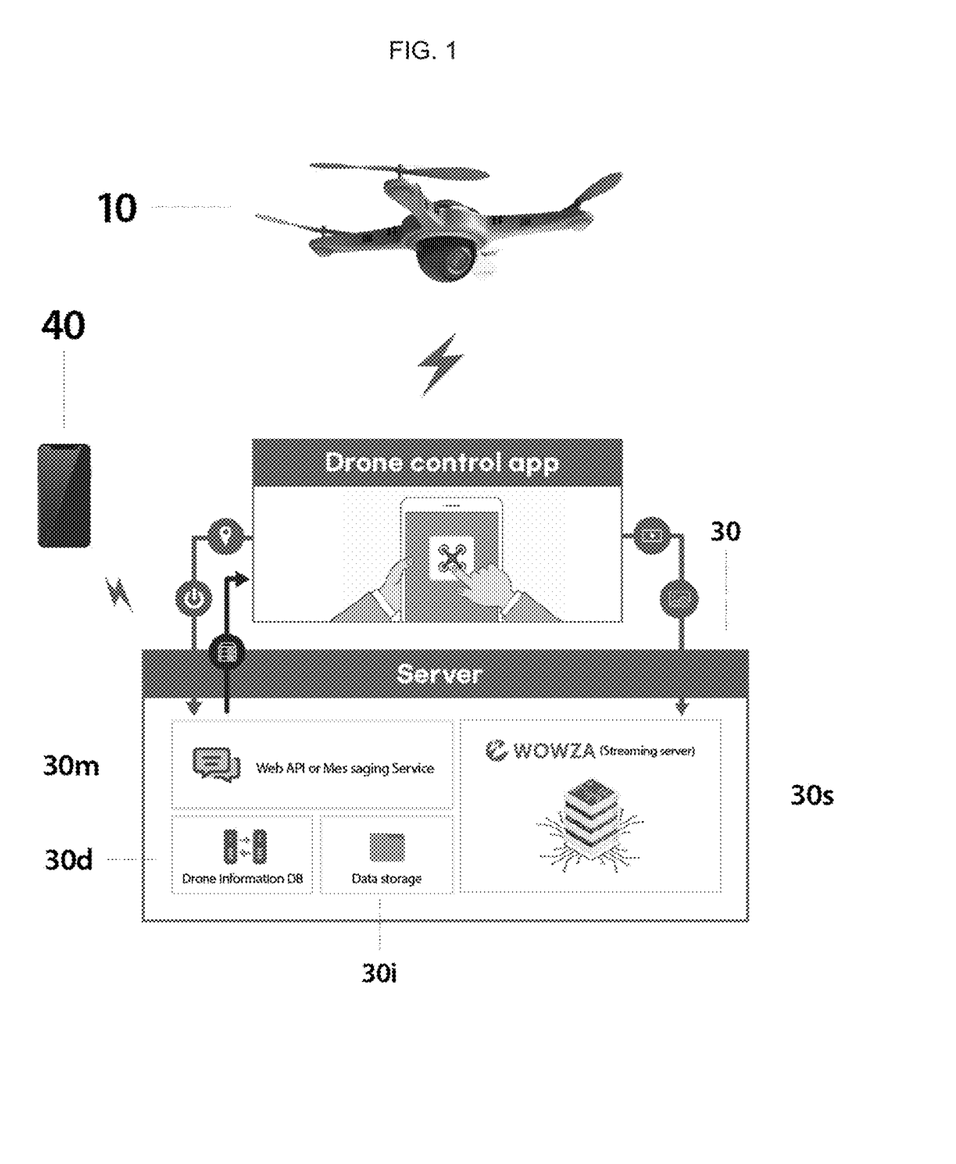
FIG. 1 is a block diagram of a panoramic image providing system according to an embodiment of the present invention.
Figure 2:
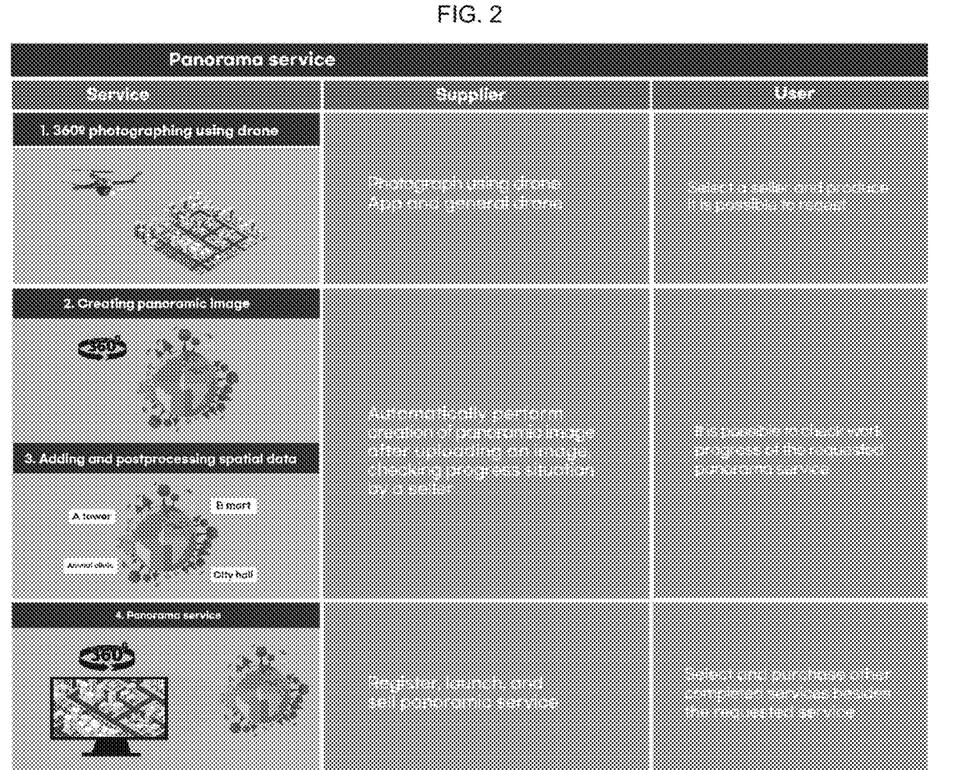
FIG. 2 is a table of service lists provided by the panoramic image providing system according to the present invention.
Figure 3:
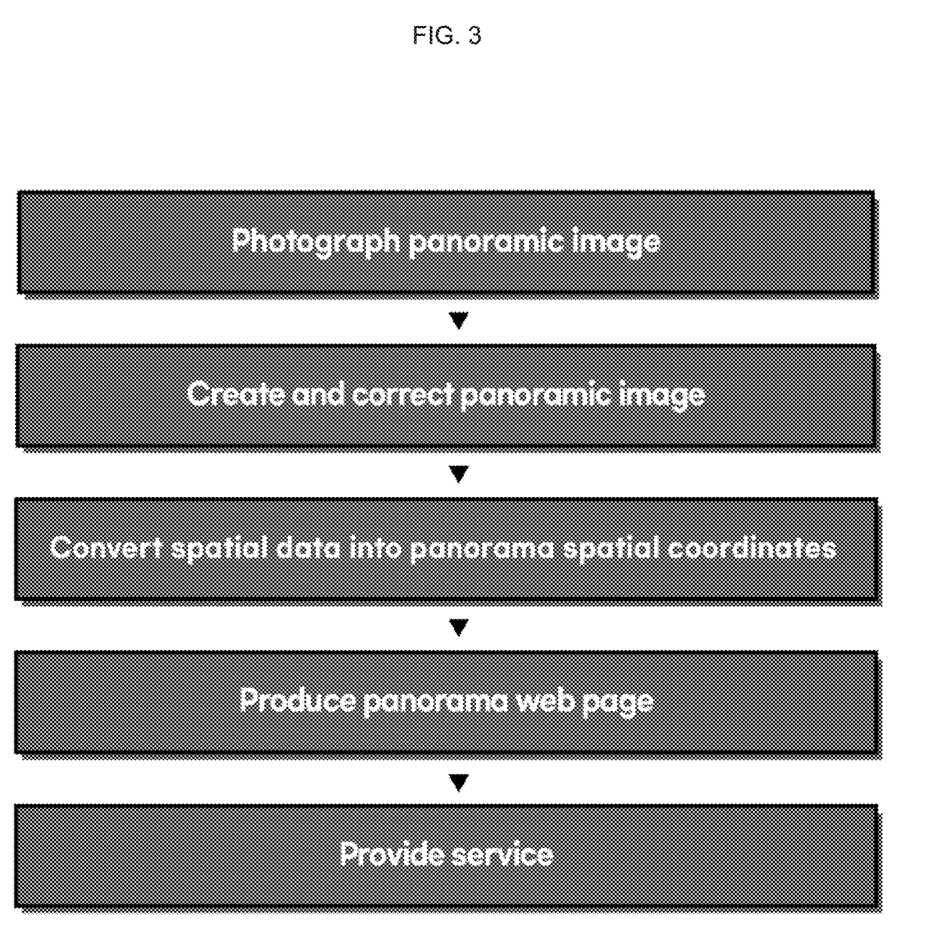
FIG. 3 is a view illustrating a service process performed by the panoramic image providing system according to the present invention.

The panoramic image providing system according to the present invention includes: a drone 10 having a camera to capture an image and remotely receiving a signal to control flight and driving of the camera; a supplier terminal 20 having a drone control application capable of controlling the drone, and collecting and transmitting image information received from the drone; a management server 30 collecting, storing and editing the image information received from the supplier terminal to provide a panoramic image; and a user terminal 40 receiving the panoramic image information provided from the management server.

The drone 10 is a drone typically used to take an image and has a camera, receives a signal transmitted from a control means to control driving of the drone, and has a communication module for transmitting and receiving a signal so as to control the operation of the camera, and the camera is a general camera that is commonly used.

The communication module provided in the drone is a bidirectional wireless communication module.

The control means for controlling the drone is the supplier terminal 20.

The supplier terminal 20 may be a portable terminal including a smartphone commonly used, and may remotely control the camera by installing the drone control application provided from the management server 30.

The drone control application installed in the supplier terminal has a driving control function for operating the drone as well as a camera control function for controlling the driving of the camera. The camera control function may be classified as a function for allowing the camera to capture a panoramic image or perform general photographing, and the camera control function may be automatically switched by clicking a button to perform general photographing or panorama photographing. The photographing method may be automatically performed by being included in the drone control application received from the management server.

The drone control application may have various functions, such as mission management of the drone, flight mission setting, and airframe setting (RC, camera, gimbal setting, etc.), a three-dimensional altitude flight API service function, and a safety setting function considering user safety.

In addition, the information provided through the drone control application may include data for a GIS background map service and Web geographic information for controlling the drone.

The management server 30 is a server which provides the drone control application for controlling the drone and panoramic image photographing to the supplier terminal, and collects and edits the panoramic image received from the supplier terminal, and has a panoramic image creating tool for editing the collected panoramic image to produce a panoramic image to provide the produced image to the user terminal, and modifying the produced image.

The management server 30 may convert the location information (longitude and latitude coordinates, and photographing altitude) of the drone measured during panorama photographing into two-dimensional and three-dimensional spatial coordinates, and then, convert the same into panorama coordinates (pitch and yaw) corresponding to the panorama coordinate system.

Figure 4:
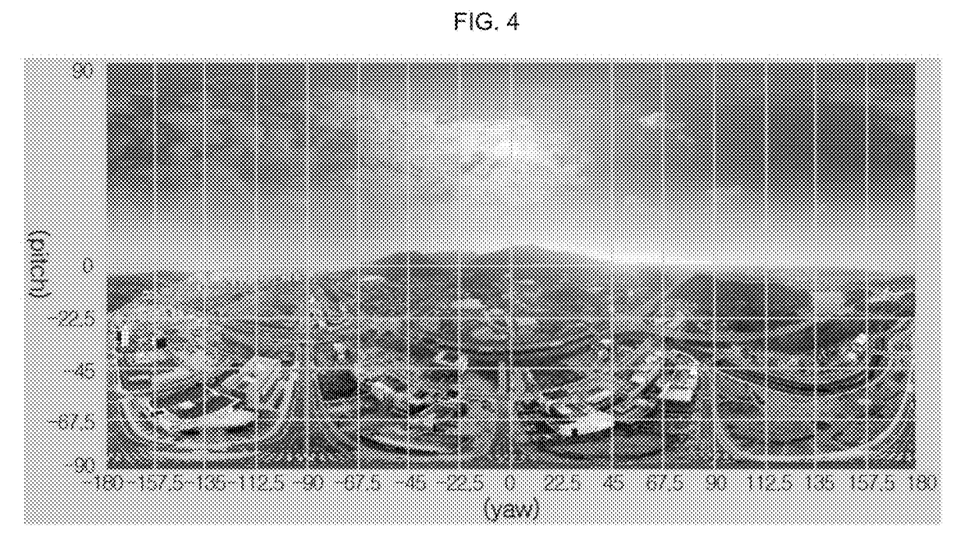
FIG. 4 is a coordinate system of a panoramic image used in the panoramic image providing system according to the present invention.
Figure 5:
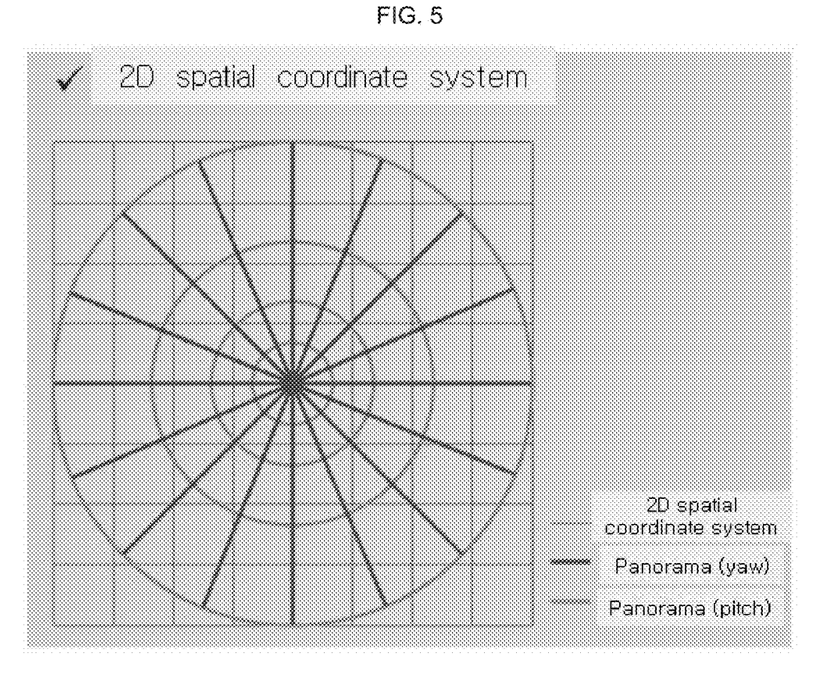
FIG. 5 is a diagram illustrating a panorama coordinate mapping used in the panoramic image providing system according to an embodiment of the present invention.

The coordinate conversion performed by the management server may be displayed on the basis of the panoramic image as illustrated in FIG. 4 or may be displayed as a two-dimensional spatial coordinate system as illustrated in FIG. 5.

Figure 6:
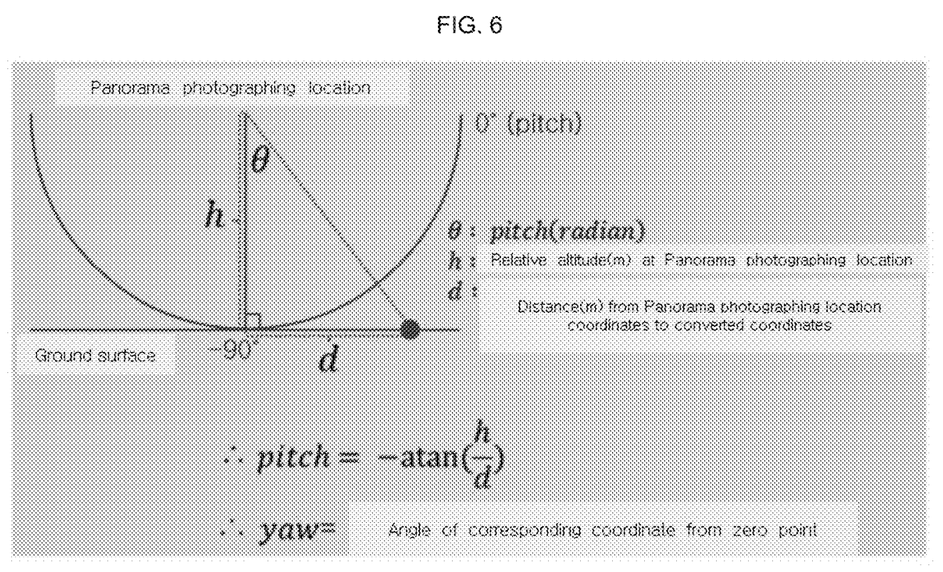
FIG. 6 is a two-dimensional panoramic spatial coordinate used in the panoramic image providing system according to the present invention.
Figure 7:
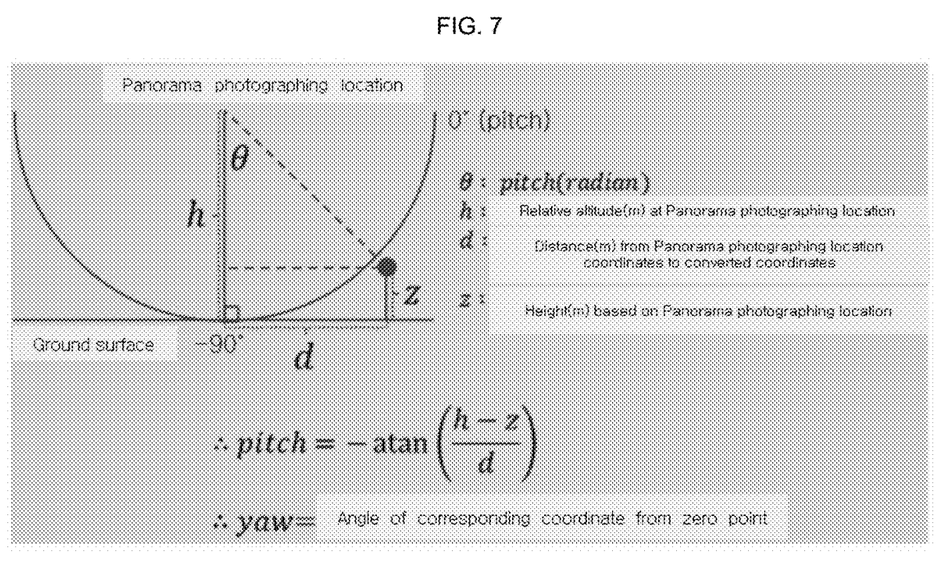
FIG. 7 is a three-dimensional panoramic spatial coordinate used in the panoramic image providing system according to the present invention.

The conversion of the spatial data into the panorama spatial coordinates may be performed by a method illustrated in FIGS. 6 and 7.

That is, the panorama spatial coordinate conversion may use a two-dimensional method and a three-dimensional method. As illustrated in FIG. 6, the two-dimensional method includes a pitch, which is a ground altitude value at a photographing location and a distance value between coordinates to be converted from the ground coordinate of the photographing location, and a yaw which is an angle of the coordinate to be converted from the photographing location:

$$\text{pitch} = -a\tan\left(\frac{h}{d}\right).$$

Here, h is a relative altitude at the panoramic image photographing location, and d is a distance ranging from the ground coordinates of the panoramic image photographing position to the conversion coordinates.

As illustrated in FIG. 7, the three-dimensional method includes a ground altitude value at a photographing location, a distance value between coordinates (2D) to be converted from the ground coordinate (2D) of the photographing location, a pitch calculated from an altitude value of coordinates to be converted, and a yaw which is an angle of the coordinate to be converted from the photographing location:

$$\text{pitch} = -a\tan\left(\frac{h-z}{d}\right).$$

Here, h is a relative altitude at the panoramic image photographing location, and d is a distance ranging from the ground coordinates of the panoramic image photographing position to the conversion coordinates, and z is a reference height of the panoramic image photographing position.

Figure 8:
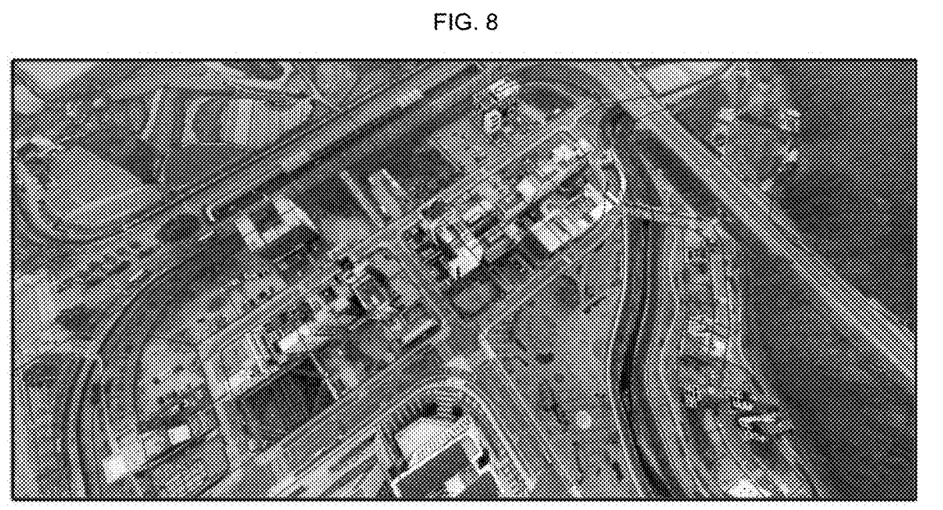
FIG. 8 illustrates a spatial image expressed as panorama coordinates in the panoramic image providing system according to an embodiment of the present invention.

The panoramic image converted by the panorama spatial coordinate conversion method may be expressed as illustrated in FIG. 8.

As described above, the management server 30 includes an information storage DB 30i for storing information including collected and edited panoramic image information.

As described above, the information storage DB 30i may further include a drone information DB 30d which stores information, such as information of the collected and edited panoramic image, supplier information, and user information, and the like, and separately storing only the drone information.

In addition, the management server 30 may include a service module 30m to provide panoramic image information to a user terminal using a messaging service, and may include a streaming server 30s to transmit image information captured by the drone to a control system, and receive video information captured by the drone and provide the received video information to the user terminal.

Figure 9:
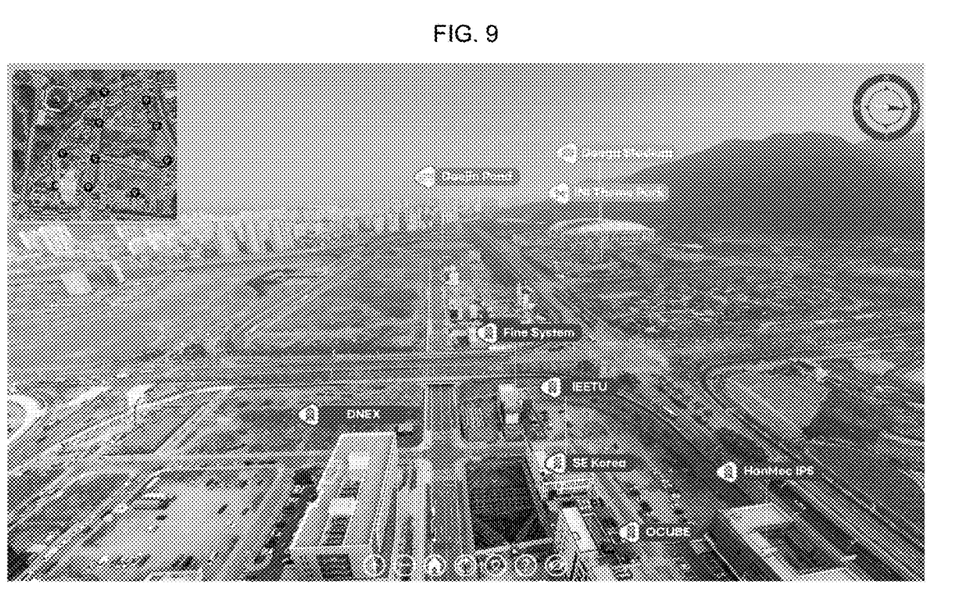
FIG. 9 illustrates a panoramic view screen provided to a user in the panoramic image providing system according to the present invention.

The information provided from the management server may be transmitted to the user terminal 40 by using wired/wireless communication, and the user terminal may receive and check such information through an application or a web provided by the management server, and an example thereof is illustrated in FIG. 9.

The invention claimed is:

1. A system for providing a panoramic image comprising:
a drone (10) having a camera to capture an image and remotely receiving a signal to control flight and driving of the camera;
a supplier terminal (20) having a drone control application capable of controlling the drone, and collecting and transmitting image information received from the drone, the drone control application having functions including mission management of the drone, flight mission setting, and airframe setting, a three-dimensional altitude flight API service function, and a safety setting function considering user safety and the image information including data for a GIS background map service and Web geographic information for controlling the drone;
a management server (30) having an information storage DB (30i) storing information including the collected and edited panoramic image information, collecting, storing and editing the image information received from the supplier terminal to provide a panoramic image, and converting position information of the drone controlled through the drone control application of the supplier terminal into spatial coordinates, the information storage DB (30i) including a drone information DB (30d) storing information including information of the collected and edited panoramic image, supplier information, and user information, and separately storing only the drone information; and
a user terminal (40) receiving the panoramic image information provided from the management server,
wherein the management server (30) includes a service module (30m) to provide panoramic image information to the user terminal (40) using a messaging service, and includes a streaming server (30s) to transmit image information captured by the drone to a control system, and receive video information captured by the drone and provide the received video information to the user terminal (40),
wherein in a case in which the management server (30) converts the position information of the drone controlled through the drone control application of the supplier terminal into two-dimensional panorama spatial coordinates and three-dimensional panorama spatial coordinates,
the spatial coordinates include two-dimensional panorama spatial coordinates and three-dimensional panorama spatial coordinates,
the two-dimensional panorama spatial coordinates include a pitch, which is a ground altitude value at a photographing location and a distance value between coordinates to be converted from the ground coordinate of the photographing location, and a yaw which is an angle of the coordinate to be converted from the photographing location:

$$\text{pitch} = -a\tan\left(\frac{h}{d}\right),$$

wherein, h is a relative altitude at the panoramic image photographing location, and d is a distance ranging from the ground coordinates of the panoramic image photographing position to the conversion coordinates, and
the three-dimensional panorama spatial coordinates include a ground altitude value at a photographing location, a distance value between coordinates (2D) to be converted from the ground coordinate (2D) of the photographing location, a pitch calculated from an altitude value of coordinates to be converted, and a yaw which is an angle of the coordinate to be converted from the photographing location:

$$\text{pitch} = -a\tan\left(\frac{h-z}{d}\right),$$

wherein h is a relative altitude at the panoramic image photographing location, and d is a distance ranging from the ground coordinates of the panoramic image photographing position to the conversion coordinates, and z is a reference height of the panoramic image photographing position.

* * * * *